Patented Feb. 16, 1943

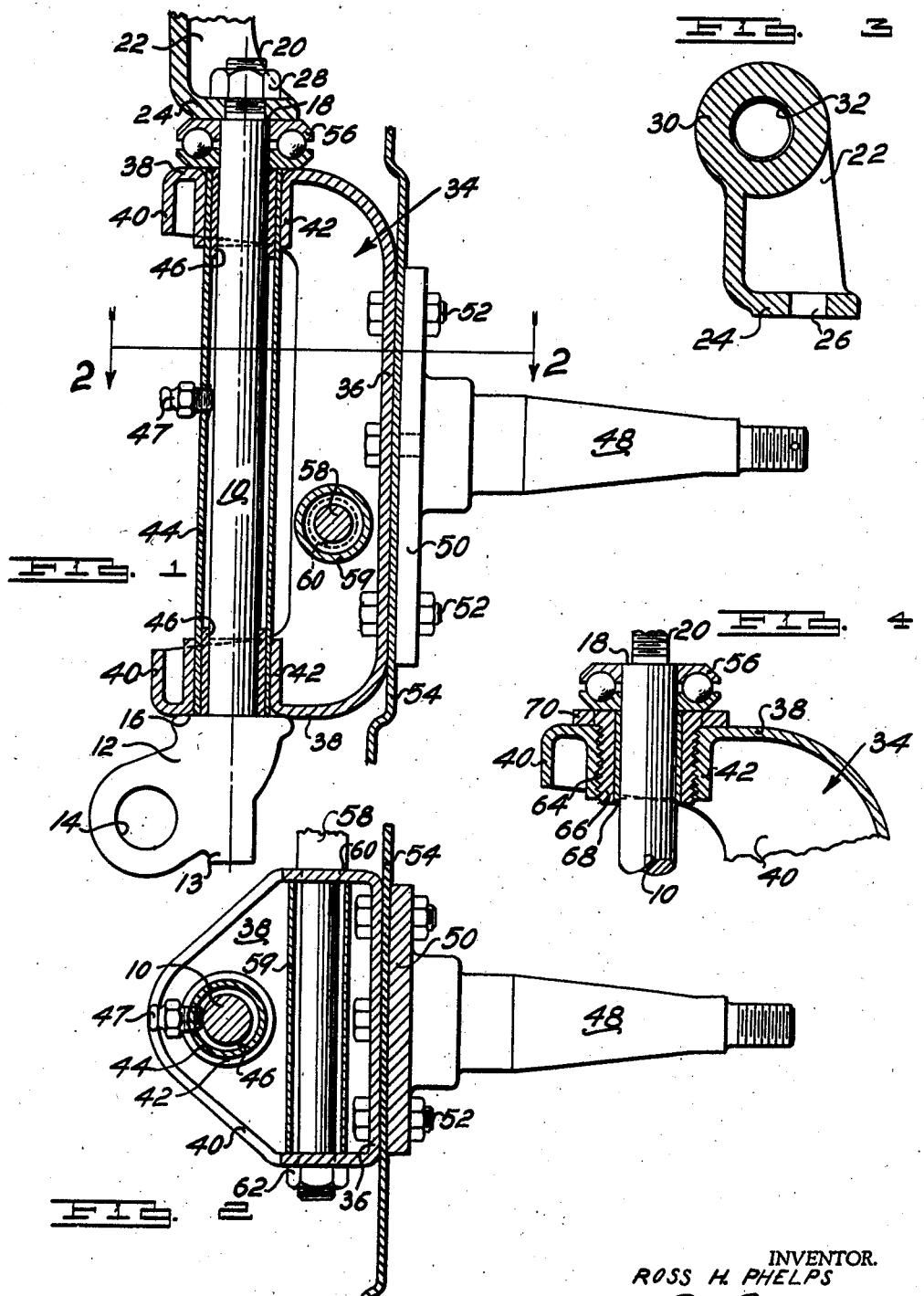

2,311,125

UNITED STATES PATENT OFFICE 2,311,125

STEERING KNUCKLE

Ross H. Phelps, Kenosha, Wis., assignor to Nash-Kelvinator Corporation, Kenosha, Wis., a corporation of Maryland Application November 25, 1940, Serial No. 366,989

20 Claims. (Cl. 280—96.1)

This invention relates to steering knuckles for automobiles and has particular reference to a steering knuckle arranged to be installed on an automobile having what is known as a parallel arm, independent wheel suspension.

It is an object of this invention to provide a steering knuckle which will decrease the unsprung weight of the suspension.

It is another object of this invention to provide a steering knuckle which will decrease the amount of overhang of the wheel beyond the king pin.

It is another object of this invention to provide a steering knuckle which may be inexpensively formed by stamping sheet metal.

Other objects and advantages of this invention will be apparent from a consideration of the following description and claims and the attached drawings, of which there is one sheet, and in which—

Figure 1 represents a vertical transverse section through a steering knuckle and king pin and showing the wheel spindle in place thereon;

Figure 2 represents a horizontal sectional view taken along a plane indicated by the line 2—2 in Figure 1 and looking in the direction of the arrows;

Figure 3 represents a vertical transverse sectional view showing the connecting link for supporting the upper end of the king pin; and Figure 4 represents a vertical transverse sectional view through a modified form of a steering knuckle.

Generally, the invention involves shaping the steering knuckle support arm of a parallel arm type of suspension in such a manner that it may also function as a king pin and providing a stamping which may be rotatably supported on the king pin. It also involves providing a stamped steering knuckle to which a backing plate and spindle for the wheel may be bolted.

The particular embodiment of the invention illustrated shows a king pin 10, the lower end of which is provided with a boss 12 which is apertured as at 14 to receive a pivot pin (not shown) for supporting the king pin on the lower control arm of a parallel arm type of suspension. The boss 12 may conveniently be formed by forging it from the king pin and is provided with a flat surfaced shoulder 16 for a purpose which will be more particularly described later. The boss 12 is also provided with an ear 13 along the main axis of the king pin 10. The ear 13 has a flat surface against which a tool for machining the king pin may be applied. The upper end of the king pin is shouldered as at 18 and provided with a threaded end 20. A bracket 22 (see Figure 3) is provided with a horizontal bottom plate 24, apertured as at 26 so as to fit over the threaded portion 20 of the king pin and rest against the shoulder 18. The bracket is held in place by means of a nut 28 threaded on the king pin. The upper portion of the bracket 22 is formed into a cylinder 30 which is internally threaded as at 32 to receive a pivot pin for connecting the bracket to an upper control arm (not shown).

The steering knuckle generally indicated at 34 is preferably formed from sheet metal as a stamping and is provided with a flat side face portion 36 which has its end portions turned inwardly to form parallel upper and lower faces 38. A flange 40 is formed completely around the edges of the stamping and the upper and lower faces 38 are apertured and extruded about the apertures as at 42.

A tubular sleeve 44 is press fitted or otherwise suitably secured within the extruded portions 42 of the steering knuckle and serves to connect the extruded portions and align the sleeves of bearing material 46 which are positioned in each end of the tube 44. The sleeves of bearing material are arranged to journal the ends of the king pin 10 and support the steering knuckle thereupon. A lubrication fitting 47 is provided in the wall of the tube 44 through which lubricant may be forced into the space between the tube and the king pin to lubricate the bearings 46.

A wheel spindle 48 provided with a flat base 50 is secured to the side face 36 of the steering knuckle by means of the bolts 52. The backing plate 54 for the brake mechanism of the wheel is clamped between the plate 50 and the side face 36 of the steering knuckle.

The lower face 38 of the steering knuckle and the lower end of the sleeve 44 are arranged to rest on the shoulder 16 on the lower end of the king pin. A suitable ball bearing assembly 56 is positioned between the upper end of the steering knuckle and the bottom plate 24 of the bracket 22. The ball bearing assembly 56 takes the thrust loads of the steering knuckle against the bracket 22 and facilitates turning of the steering knuckle about the king pin.

A steering arm 58 is provided with a shoulder at 60 (see Figure 2) and is passed through the flanges 40 of the steering knuckle where it is secured by means of the nut 62. A sleeve 59 is positioned around the arm 58 between the flanges 40 to keep the flanges from collapsing.

The steering arm 58 may be connected to any desirable type of steering linkage for turning the steering knuckle about the king pin 10.

In the modified form of the invention illustrated in Figure 4 the extruded portion 42 of the end 38 of the steering knuckle is provided with a shallow internal thread as at 64. The thread portion 64 is arranged to receive the threads of a bushing 66 which in turn supports a sleeve 68 of bearing material. The bushing 68 is provided with a flange 70 which is shaped in the form of a hexagonal head so that the bushing may be screwed into the threads of the steering knuckle. The ball bearing assembly 56 is seated against the upper surface of the flange 70 and serves the same purpose as the bearing assembly 56 shown in Figure 1.

From the above description it should be evident that the king pin 10 functions both as a king pin about which the steering knuckle 34 is rotated and as a support arm to connect the steering knuckle to the ends of the control arms of the parallel arm suspension. Since the king pin acts both as a king pin and a control arm, the weight of one of these parts is eliminated from the suspension. Further, it is not necessary to provide a king pin offset from the axis of the support arm so that the spindle 48 is moved closer to the axis of the king pin, thus reducing the distance between the point of support of the wheel on the spindle and the axis of the support arm which in this case is also the king pin 10.

While I have described my invention in some detail, I intend this description to be an example only and not as a limitation of my invention, to which I make the following claims:

1. In an automotive wheel suspension, a steering knuckle formed of sheet metal and pressed to form a flat side having generally flat upper and lower ends extending transversely away from said side, and a continuous flange formed around all edges of said stamping.

2. In an automotive wheel suspension, a steering knuckle formed of sheet metal and pressed to form a flat side having generally flat upper and lower ends bent over therefrom, and a continuous flange formed around all edges of said stamping, said upper and lower ends having apertures defined by extruded portions extending toward each other.

3. In an automotive suspension, a steering knuckle having a flat side face, upper and lower plane faces extending transversely away from said side face, and a continuous flange formed around all edges of said upper, lower, and side faces of said steering knuckle.

4. In an automotive suspension, a steering knuckle having a flat side face, upper and lower faces extending from said side face, and a continuous flange formed around all edges of said upper, lower, and side faces of said steering knuckle, the upper and lower faces of said steering knuckle being pierced and extruded inwardly of said steering knuckle toward each other.

5. In an automotive suspension, a steering knuckle having a flat side plate, upper and lower end plates bent from said side plate and parallel to each other, flanges bent from the edges of said side plate, and a steering arm extending between said flanges and secured thereto.

6. In an automotive suspension, a steering knuckle having a flat side plate, upper and lower end plates bent from said side plate and parallel to each other, flanges bent from the edges of said side plate, and a steering knuckle arm secured to said flanges, the upper and lower end plates of said steering knuckle being pierced and extruded inwardly toward each other.

7. In an automotive wheel suspension, a stamping having a flat generally vertical side face, a wheel spindle secured to said side face, a backing plate secured between said spindle and said side face, upper and lower end faces bent over from said side face on the opposite side thereof from said spindle, said upper and lower faces being pierced and extruded inwardly toward each other, and a flange bent inwardly from all edges of said upper and lower faces and said side face.

8. In an automotive wheel suspension, a stamping having a flat generally vertical side face, a wheel spindle secured to said side face, a backing plate secured between said spindle and said side face, upper and lower end faces bent over from said side face on the opposite side thereof from said spindle, said upper and lower faces being pierced and extruded inwardly toward each other, and a flange bent inwardly from all edges of said upper and lower faces and said side face, said flange being apertured to receive a steering arm.

9. In an automotive wheel suspension, a generally C-shaped stamping, the arms of said stamping being pierced and extruded inwardly of said stamping toward each other, a flange bent inwardly of said stamping around all edges thereof, a tubular sleeve positioned within the extruded portions of the upper and lower arms of said stamping and extending therebetween, bearings positioned in each end of said sleeve, and a steering arm secured to said flanges along the sides of said stamping.

10. In an automotive wheel suspension, a stamping having a generally vertical side face, a wheel spindle secured to said side face, a backing plate secured to said side face, upper and lower end faces bent over from said side face on the opposite side thereof from said spindle, said upper and lower end faces being pierced and extruded inwardly toward each other, and a flange bent inwardly from all edges of said upper and lower end faces and said side face.

11. In an automotive wheel suspension, a stamping having a flat generally vertical side face, a wheel spindle secured to said side face, a backing plate secured to said side face, upper and lower end faces bent over from said side face on the opposite side thereof from said spindle, said upper and lower faces being pierced and extruded in axial alignment, and a flange bent over from all edges of said upper and lower faces and said side face.

12. In an automotive wheel suspension, a generally C-shaped stamping, the arms of said stamping being pierced and extruded in axial alignment, a flange bent over along all edges of said stamping, a tubular sleeve positioned within the extruded portions of the upper and lower arms of said stamping and extending therebetween, bearings positioned in each end of said sleeve, a king pin journaled in said bearings and extending through said tubular sleeve, and a lubricant fitting positioned in the wall of said tubular sleeve and communicating with the space between said king pin and tubular sleeve.

13. In an automotive wheel suspension, a generally C-shaped stamping, the arms of said stamping being pierced and extruded in axial alignment, a flange bent over along all edges of said stamping, a tubular sleeve positioned within the extruded portions of the upper and lower arms of said stamping and extending therebetween, bearings positioned in said sleeve, a king pin journaled in said bearings and extending through said tubular sleeve, a lubricant fitting positioned in the wall of said tubular sleeve and communicating with the space between said king pin and tubular sleeve, and a wheel spindle secured to the side of the C-shaped stamping.

14. In an automotive wheel suspension, a kin pin arranged to be attached directly to a control arm of a parallel arm suspension, a generally C-shaped stamping having its arms pierced and extruded in axial alignment, a tubular sleeve positioned in said extruded portions and extending therebetween, said sleeve being positioned around said king pin, flanges turned inwardly from all edges of said stamping, a steering arm connected to one of said flanges, and a wheel spindle secured to the side of said C-shaped stamping.

15. In an automotive wheel suspension, a king pin arranged to be attached directly to a control arm of a parallel arm suspension, a generally C-shaped stamping having its arms pierced and extruded in axial alignment, a tubular sleeve positioned in said extruded portions and extending therebetween, said sleeve being positioned around said king pin, flanges turned inwardly from all edges of said stamping, a steering arm connected to one of said flanges, a wheel spindle secured to the side of said C-shaped stamping, and a lubricant fitting secured in the wall of said tubular sleeve and arranged to admit lubricant to the space between said sleeve and said king pin.

16. In an automotive wheel suspension, a stamping having a generally vertical side face, a wheel spindle secured to said side face, a backing plate secured between said spindle and said side face, upper and lower end faces bent over from said side face on the opposite side thereof from said spindle, said upper and lower faces being pierced and extruded inwardly toward each other, a flange bent inwardly from all edges of said upper and lower faces and said side face, and bushings having a coarse threaded connection with the extruded portions of said stamping, said bushings supporting a sleeve of bearing material.

17. In an automotive wheel suspension, a stamping having a side face with upper and lower end faces bent over therefrom, said end faces being pierced and extruded in axial alignment, bushings threaded in said extruded portions, said bushings defining aligned apertures having bearing surfaces, and a king pin journaled in said bushings.

18. In an automotive suspension, a steering knuckle having a flat side plate, upper and lower end plates bent over from each end of said side plate, a continuous flange extending along each side of said side plate and around said end plates, said flange defining a pair of aligned apertures, a steering arm extending through said apertures and secured to said flange, and a sleeve positioned around said steering arm and between the opposite sides of said flange.

19. In an automotive wheel suspension, a generally C-shaped stamping comprising a plane flat vertically extending central portion and plane flat laterally extending upper and lower portions, and a flange extending from the edges of said central portion and entirely therealong and joined to said upper and lower portions to serve as a means for strengthening said portions against collapse.

20. In an automotive wheel suspension, a generally C-shaped stamping comprising a plane flat vertically extending central portion and plane flat laterally extending upper and lower portions, and a flange extending continuously around the edges of the upper, central and lower portions.

ROSS H. PHELPS.